No. 12,200. REISSUED MAR. 1, 1904.

J. A. SHERRARD.

BOTTLE TAP.

APPLICATION FILED JUNE 12, 1903.

2 SHEETS—SHEET 1.

Witnesses

J. G. Stinkel

Thos. Gillman, Jr.

Inventor

Joseph Alfred Sherrard

By Foster Freeman Watson

Attorneys

No. 12,200. REISSUED MAR. 1, 1904.

J. A. SHERRARD.

BOTTLE TAP.

APPLICATION FILED JUNE 12, 1903.

2 SHEETS—SHEET 2.

Witnesses
J. G. Stinkel
Thos. Gillman, Jr.

Inventor
Joseph Alfred Sherrard

By Foster Freeman & Watson

Attorneys

No. 12,200. Reissued March 1, 1904.

UNITED STATES PATENT OFFICE.

JOSEPH ALFRED SHERRARD, OF BOSTON, MASSACHUSETTS.

BOTTLE-TAP.

SPECIFICATION forming part of Reissued Letters Patent No. 12,200, dated March 1, 1904.

Original No. 718,163, dated January 13, 1903. Application for reissue filed June 12, 1903. Serial No. 161,208.

*To all whom it may concern:*

Be it known that I, JOSEPH ALFRED SHERRARD, a citizen of the United States, residing at Boston, in the county of Suffolk and State of Massachusetts, have invented certain new and useful Improvements in Bottle-Taps, of which the following is a specification.

This invention has for its object to provide a simple and efficient means for tapping closed or corked bottles or other receptacles containing liquids and also for creating an air-pressure within the bottle to facilitate the discharge of the liquid therefrom.

The invention consists in the improvements which I will now proceed to describe and claim.

Figure 1:
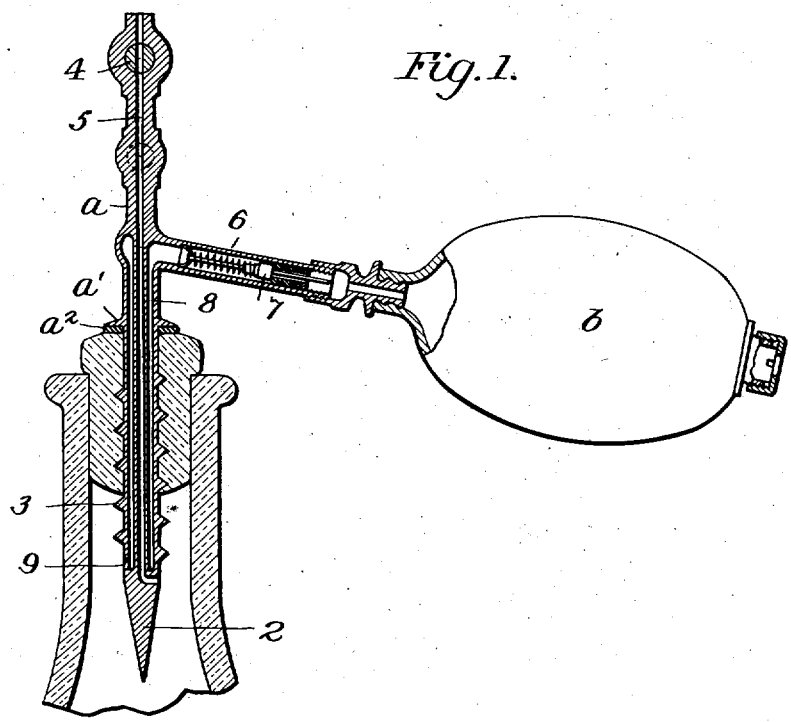
Figure 3:
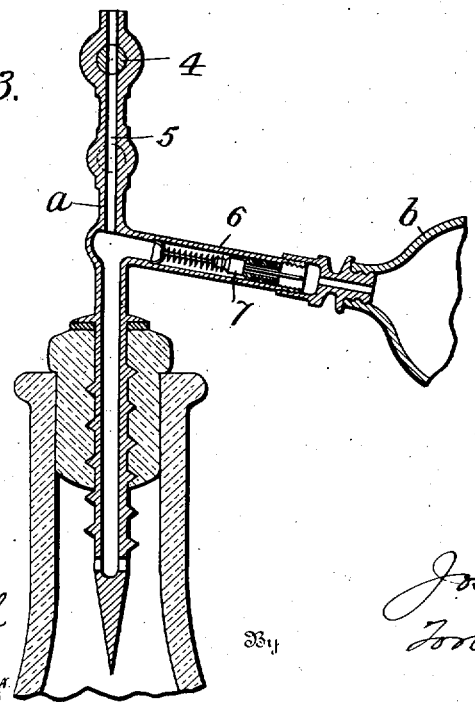
Figure 2:
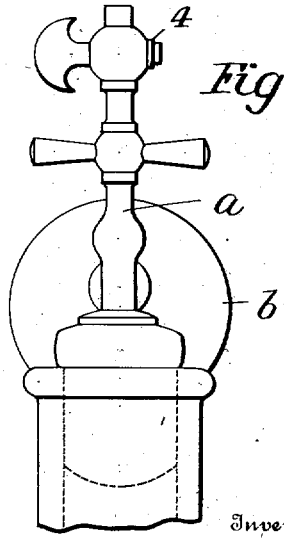
Figures 4, 5:
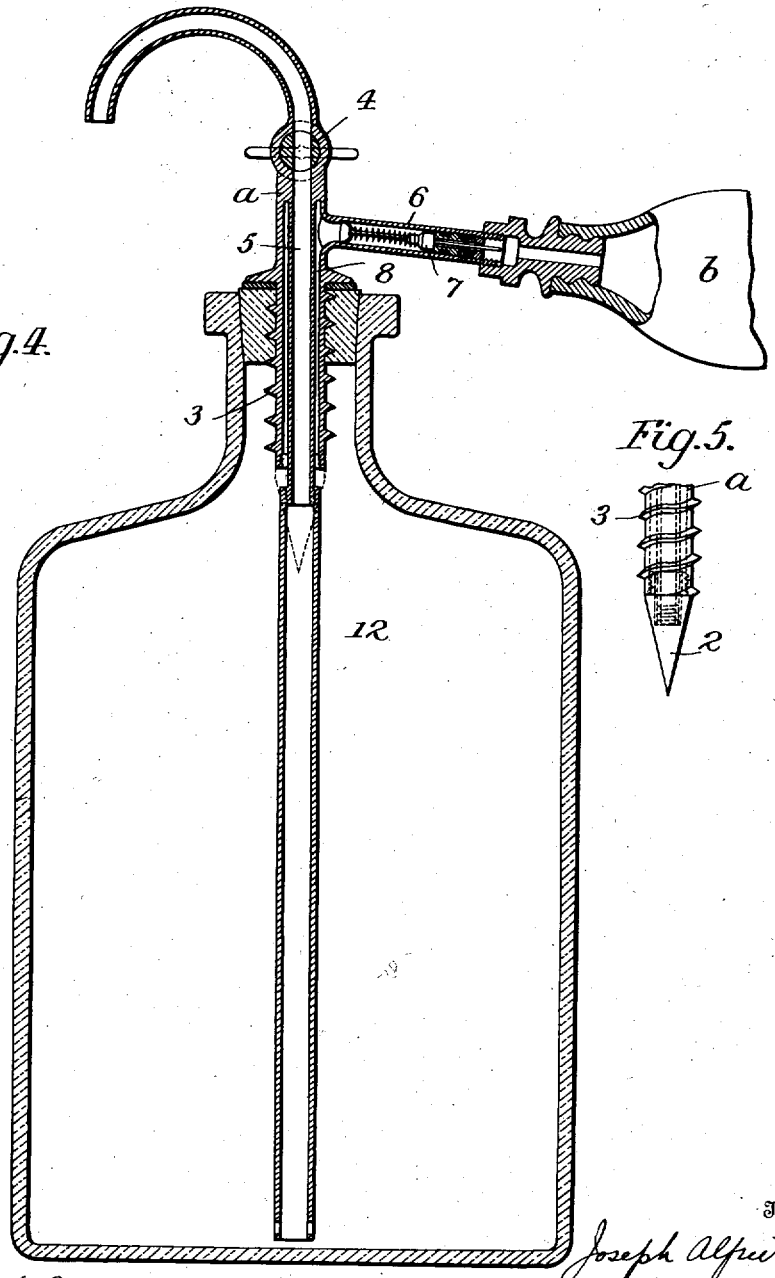

In the accompanying drawings, forming a part of this specification, Figure 1 represents a sectional view of my improved bottle-tap and a portion of a bottle in which the same is inserted. Fig. 2 represents a side elevation of a portion of the tap and of the bottle-neck. Fig. 3 represents a view similar to Fig. 1, showing a modification. Fig. 4 represents a view similar to Fig. 1, showing the tap made on a larger scale and provided with an extension adapted to reach to the bottom of a bottle or carboy. Fig. 5 represents a view of a portion of the construction shown in Fig. 4.

The same reference characters indicate the same parts in all the figures.

My improved bottle-tap comprises a rigid tubular conduit *a*, the inner portion of which is formed to penetrate a bottle-stopper, said inner portion having a penetrating-point 2 and a helical cutting-rib or screw-thread 3. At the outer end portion of the conduit *a* is a cock 4, adapted to open or close the liquid duct or passage 5, which extends through the conduit. The conduit *a* is provided between the cock 4 and the penetrating portion with a branch 6, containing a spring-pressed air-valve 7. Said branch, as shown in Fig. 1, communicates with an annular air-duct 8, surrounding the liquid-duct 5, said air-duct communicating with the interior of the bottle through one or more openings 9. As shown in Fig. 3, the branch 6 communicates with the liquid-duct 5.

*b* represents an air-pump which is connected with the branch 6 and is adapted to force air through the latter, the valve 7 yielding to permit the entrance of air from the pump and closing automatically to prevent the backward passage of air from the branch to the pump. The pump may be of any suitable construction, it being here shown as a collapsible elastic bulb, such as is used for syringes. It is obvious, however, that a pump similar to that used for inflating bicycle-tires may be employed, if desired. It will be seen that when the pump is operated to force air through the branch 6, the cock 4 being closed, the air finds its way into the interior of the bottle and exerts pressure on the contents thereof. When the cock 4 is opened, the air-pressure forces the liquid through the duct 5, the valve 7 preventing the escape of liquid through the branch 6. In the case of fluids which are not aerated or where the gas has escaped from the latter a most important function of the arrangement illustrated in Fig. 1 is the ability to discharge the contents of the inverted bottle forcibly through the channel 5 by forcing the air through the other channel by means of the air-pump *b*. As the air and liquid channels open to opposite sides of the tube and as in Fig. 1 the air-channel is nearest the top of the bottle and when the bottle is inverted, there is no interference with the liquid-outflow by the inflowing air. By this means the pressure is brought to bear upon the contents without in any way interfering with the discharge of the liquid through the stem, while at the same time the penetration of the cork by means of the pointed stem with the cock 4 closed can be effected without permitting the escape of any of the gases when the latter are within the bottle. It will be seen, therefore, that the described tap having provisions for accumulating air-pressure in a bottle may be used to good advantage in drawing bottled liquids of various kinds, either effervescent or still, and particularly useful in drawing champagne or other effervescent liquid, the pump being operated after a given quantity of the liquid has been withdrawn and creating fresh pressure, so that another charge may be caused to flow rapidly from the bottle.

The conduit is provided with a rigid flange or shoulder $a'$, between which and the top of the stopper is interposed a compressible packing-washer $a^2$, which prevents the escape of gas or air under pressure from the interior of the bottle.

In Fig. 4 I show a construction similar to that shown in Fig. 1, excepting that the penetrating-point 2 is made separable from the body of the conduit, the lower end of the liquid-duct 5 being extended and provided with a screw-thread, to which may be coupled an extension 12, adapted to extend to the bottom of a bottle or carboy.

My improved tap will draw contents from any bottle, whether the liquid is aerated or plain. The said tap is adapted to aerate a bottle of ale, beer, porter, or similar liquid, so that the bottle may be opened, a part of the contents used, and the remainder allowed to stand indefinitely and be drawn off when required, when contents will be found in as good condition as when first tapped. In fact, the bottle may be opened and a glass or more of the liquid used. The cork may then be replaced, and when the remainder of the contents are required the tap may be screwed into the cork, pressure applied, and the contents will be found in as good condition as the first glass.

Champagne, apollinaris, and all aerated or carbonated liquids, as well as still waters of all kinds, may be drawn from the bottle without the removal of the cork.

When the first glass of champagne has been drawn from the bottle, it is suggested that the air-pressure be immediately applied, so as to replace the gases, which always escape when liquid is drawn.

I claim—

1. A bottle-tap comprising a tubular conduit provided with a pointed end, a cock on the opposite end of said conduit, a valved branch leading from the conduit intermediate of said cock and pointed end, a flange or shoulder formed on said conduit, a compressible packing-washer located below said flange, and an air-pump connected to said branch and adapted to force air into the conduit, the said cock when closed causing the air to enter the bottle and act upon the contents thereof, and when open permitting the discharge of said contents through the conduit.

2. A bottle-tap provided with a stem having a pointed end integral therewith and cross-handle whereby it may be forced through a cork, a channel extending through said stem from the upper end to a port at the side near the lower end, with a cock near the upper end for closing said channel, a second channel communicating with a port at the opposite side near the lower end of the stem and also with an upper port below said cock, and an air-pump communicating with said second channel, substantially as set forth.

3. The tubular threaded and pointed conduit having air and liquid channels extending through the same, and communicating with ports on opposite sides, the liquid-port nearest the point, in combination with an air-pump communicating with the air-channel, substantially as set forth.

In testimony whereof I have signed my name to this specification in the presence of two subscribing witnesses.

JOSEPH ALFRED SHERRARD.

Witnesses:

MICHAEL F. CURRAN,
HARRY B. EMERY.